(12) United States Patent
Min et al.

(10) Patent No.: US 9,866,753 B2
(45) Date of Patent: Jan. 9, 2018

(54) ELECTRONIC DEVICE HAVING CAMERA AND METHOD FOR OPERATING THE SAME

(71) Applicant: Samsung Electronics Co., Ltd., Gyeonggi-do (KR)

(72) Inventors: Jeonghwan Min, Gyeonggi-do (KR); Yoonnyung Kim, Gyeonggi-do (KR); Sunghwan Moon, Gyeonggi-do (KR); Kyungmin Park, Busan (KR); Kwangman Ok, Gyeonggi-do (KR); Junhyuk Lee, Seoul (KR); Sukjin Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 44 days.

(21) Appl. No.: 14/501,801

(22) Filed: Sep. 30, 2014

(65) Prior Publication Data

US 2015/0103224 A1  Apr. 16, 2015

(30) Foreign Application Priority Data

Oct. 10, 2013  (KR) .......................... 10-2013-0120527

(51) Int. Cl.
*H04N 5/232* (2006.01)
(52) U.S. Cl.
CPC .............................. *H04N 5/23241* (2013.01)
(58) Field of Classification Search
CPC ............................. H04N 5/23241; G06F 3/041
See application file for complete search history.

(56) References Cited

U.S. PATENT DOCUMENTS

| 6,734,845 | B1 * | 5/2004 | Nielsen | G06F 1/3209 |
| | | | | 345/211 |
| 7,471,334 | B1 * | 12/2008 | Stenger | G03B 29/00 |
| | | | | 348/143 |
| 2003/0125008 | A1 * | 7/2003 | Shimamura | H04M 1/0214 |
| | | | | 455/344 |
| 2008/0279537 | A1 * | 11/2008 | Doba | H04N 5/23241 |
| | | | | 386/326 |
| 2010/0245609 | A1 * | 9/2010 | Estevez | G06T 7/0081 |
| | | | | 348/222.1 |

(Continued)

FOREIGN PATENT DOCUMENTS

| KR | 10-2012-0060677 A | 6/2012 |
| KR | 10-2012-0126842 A | 11/2012 |

*Primary Examiner* — Christopher K Peterson
(74) *Attorney, Agent, or Firm* — Cha & Reiter, LLC.

(57) ABSTRACT

Disclosed herein is a method of operating an electronic device having a camera. The electronic device includes a camera, a display unit, a sensor unit configured to detect an external event value, an image processor configured to process data received through the camera into a preview image, and a main processor. The main processor is configured to switch from a preview mode to a ready mode when the external event value is detected by the sensor unit, wherein the preview mode comprises activation of the camera, the image processor to display the preview image on the display unit, and the ready mode comprises deactivation of the camera and the image processor and display of a ready mode image on the display unit.

19 Claims, 6 Drawing Sheets

(56) References Cited

U.S. PATENT DOCUMENTS

| | | | | |
|---|---|---|---|---|
| 2012/0105740 A1* | 5/2012 | Jannard | .................... | G02C 9/04 |
| | | | | 348/794 |
| 2014/0139669 A1* | 5/2014 | Petrillo | .................... | B60R 1/00 |
| | | | | 348/148 |
| 2014/0208145 A1* | 7/2014 | Piccolotto | ................. | G06F 1/32 |
| | | | | 713/324 |
| 2014/0375820 A1* | 12/2014 | Priyantha | ............. | H04N 5/2258 |
| | | | | 348/164 |

* cited by examiner

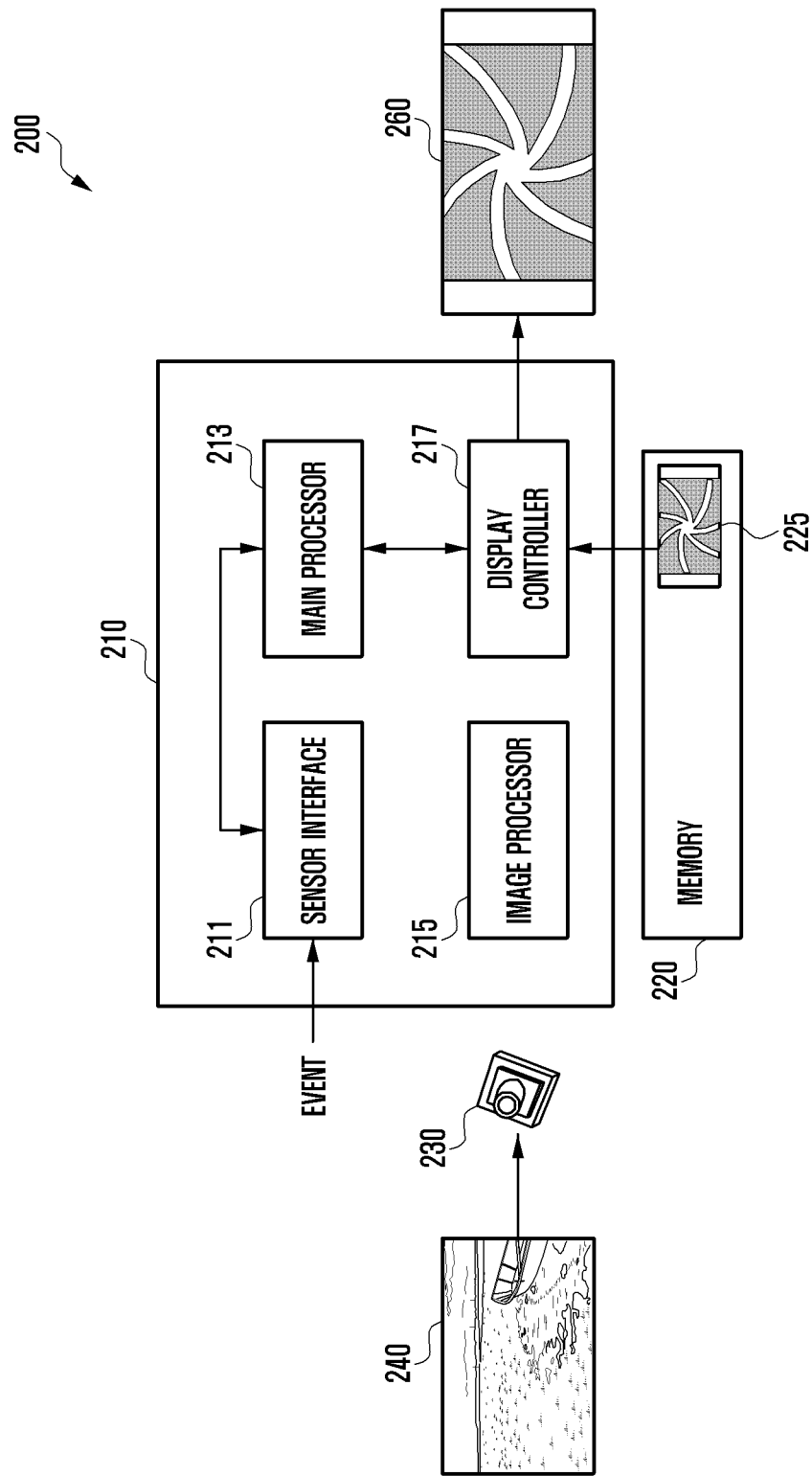

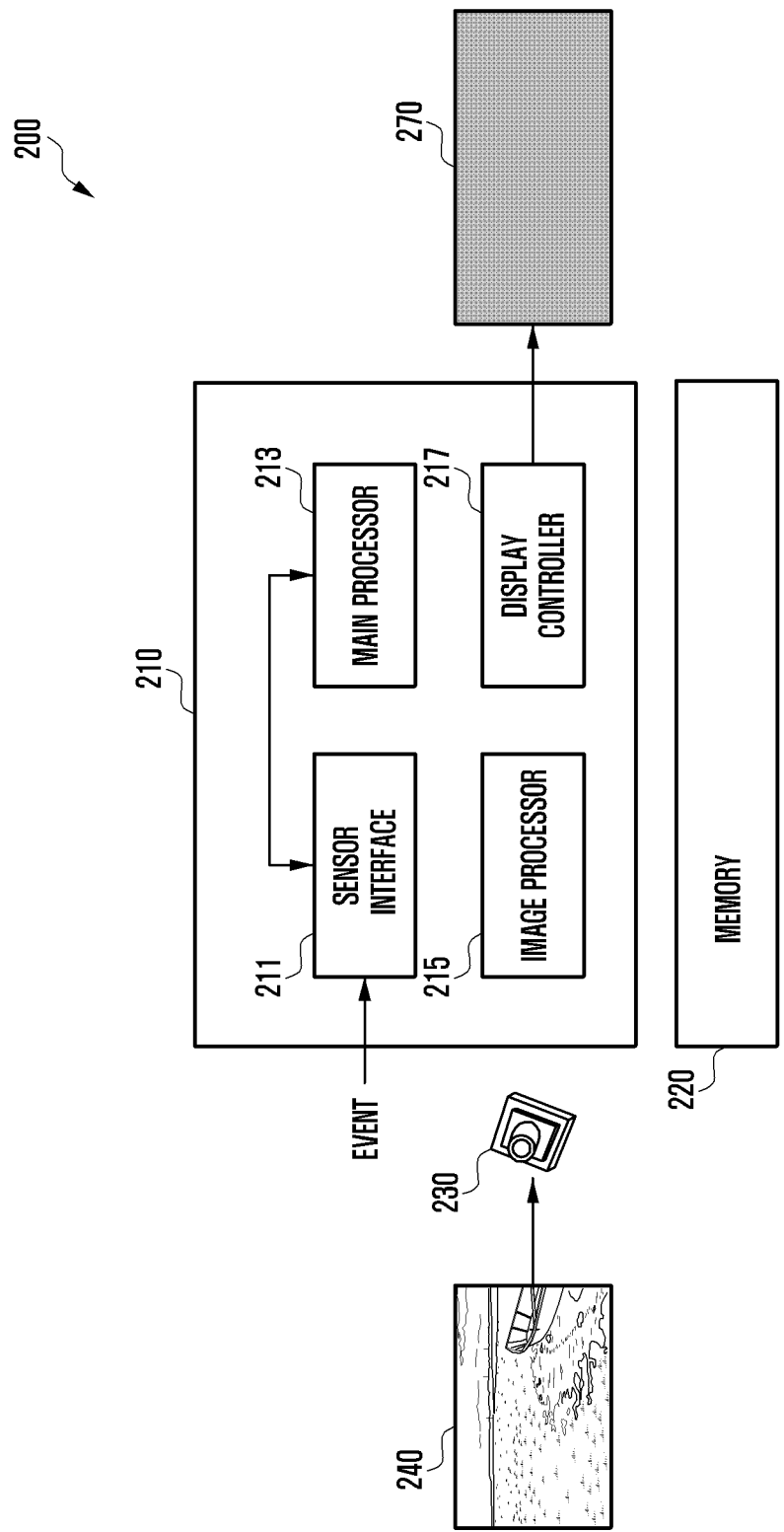

ELECTRONIC DEVICE HAVING CAMERA AND METHOD FOR OPERATING THE SAME

CROSS-REFERENCE TO RELATED APPLICATION

This application claims priority from and the benefit under 35 U.S.C. §119(a) of Korean Patent Application No. 10-2013-0120527, filed on Oct. 10, 2013, which is hereby incorporated by reference for all purposes as if fully set forth herein.

TECHNICAL FIELD

The present disclosure relates generally to an electronic device, and, more particularly, to an electronic device having a camera and a method for operating the same.

BACKGROUND

When capturing an image using an electronic device having a camera, the electronic device may display a preview image on a screen or display, capture the image indicated by the preview, and store the captured image. The electronic device may perform the aforementioned operation in a preview mode. A sleep mode may be utilized to conserve energy when not capturing an image. In the sleep mode, the electronic device may turn off the screen and enter the sleep mode from the preview mode. The sleep mode may be triggered when a input is not received from the user in the preview mode for a predetermined time. Alternatively, it may be triggered manually via a key input, activation of which causing the electronic device to enter the sleep mode from the preview mode. In the sleep mode, the electronic device turns off the screen, and thus electric power consumption is reduced. The electronic device may enter the preview mode from the sleep mode through a physical key input for entering the preview mode.

SUMMARY

When an electronic device processes image data in the preview mode and outputs the processed image data on the screen, a large amount of power may be unnecessarily consumed. That is, processing preview images in realtime and outputs the processed image data regardless of the user's intention, the electronic device consumes a large amount of power in order to display preview images on the screen.

In order to reduce the amount of consumed power, the electronic device may enter a sleep mode from the preview mode. This may be triggered, for example, by a physical key input. When switching from the preview mode to the sleep mode or from the sleep mode to the preview mode is frequently performed, a user may feel inconvenience due to a repetitive key input. Therefore, since a user stays in the preview mode for a long time, the electronic device unnecessarily consumes a large amount of power.

An electronic device according to an embodiment of the present disclosure checks the occurrence of an event by using a sensor, and the present disclosure provides a method capable of reducing power unnecessarily consumed by switching a mode of the electronic device based on the occurrence of the event.

In accordance with an aspect of the present disclosure, a method of operating an electronic device having a camera is provided. The method includes: executing a preview mode wherein the camera and an image processor are active to display a preview image received via the camera on the display, while in the preview mode, detecting an external event value through a sensor unit of the electronic device indicating execution of a ready mode, executing the ready mode, the ready mode comprising deactivation of the image processor and display of a ready mode image on the display.

In accordance with another aspect of the present disclosure, an electronic device is provided. The electronic device includes: a camera, a display unit, a sensor unit configured to detect an external event value, an image processor configured to process data received through the camera into a preview image, and a main processor.

The main processor is configured to switch from a preview mode to a ready mode when the external event value is detected by the sensor unit, wherein the preview mode comprises activation of the camera, the image processor to display the preview image on the display unit, and the ready mode comprises deactivation of the camera and the image processor and display of a ready mode image on the display unit.

In accordance with a method of operating an electronic device according to various embodiments of the present disclosure, the occurrence of an event is detected using a sensor and an operation of the electronic device is controlled based on the detected event. Furthermore, the electronic device can generate a ready mode between the preview mode and the sleep mode. In addition, the electronic device switches from the preview mode to the ready mode or switches from the ready mode to the preview mode in correspondence with the event, thereby reducing power that is unnecessarily consumed in the preview mode.

BRIEF DESCRIPTION OF THE DRAWINGS

The present disclosure will be more apparent from the following detailed description in conjunction with the accompanying drawings, in which:

FIG. 2B is a diagram illustrating example operations of a control unit in a ready mode according to an embodiment of the present disclosure;

FIG. 2C is a diagram illustrating example operations of a control unit in a sleep mode according to an embodiment of the present disclosure;

DETAILED DESCRIPTION

Figure 1:
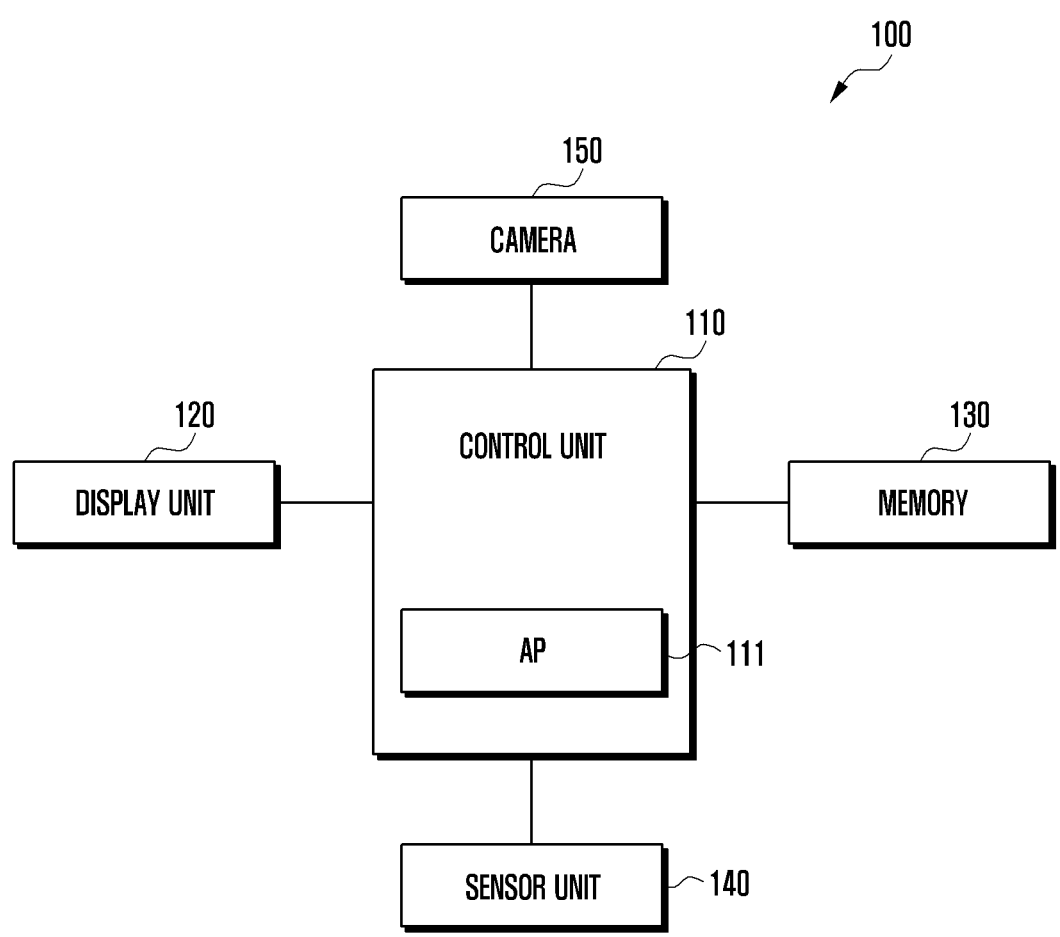
FIG. 1 is a block diagram of an electronic device according to an embodiment of the present disclosure.

Hereinafter, various embodiments of the present disclosure will be described in detail with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed, but the present disclosure should be construed to cover all modifications, equivalents, and alternatives falling within the various embodiments of invention. It should be noted that the same elements will be designated by the same reference numerals although they are shown in different drawings. Further, detailed descriptions related to well-known functions or configurations capable of making subject matters of the present disclosure unnecessarily obscure will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present disclosure, the expression "or" includes any or all combinations of words enumerated together. For example, the expression "A or B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first constituent element may be termed a second constituent element, and likewise a second constituent element may also be termed a first constituent element without departing from the various embodiments of the present disclosure.

In the case where a component is referred to as being "connected" or "accessed" to another component, it should be understood that not only the component is directly connected or accessed to the other component, but also, there may exist another component between them. Meanwhile, in the case where a component is referred to as being "directly connected" or "directly accessed" to other component, it should be understood that there is no component therebetween.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to embodiments of the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (for example, a Head-Mounted-Device (HMD) such as electronic glasses, electronic clothes, an electronic bracelet, an electronic necklace, an electronic accessory, an electronic tattoo, or a smart watch).

According to some embodiments, the electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, or an electronic picture frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, or a point of sales (POS) of a shop.

According to some embodiments, the electronic device may include at least one of a part of furniture or a building/structure having a communication function, an electronic board, an electronic signature receiving device, a projector, or various kinds of measuring instruments (e.g., a water meter, an electric meter, a gas meter, a radio wave meter, or the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments will be described with reference to the accompanying drawings. A term "user" used in various embodiments of the present disclosure may indicate a person using an electronic device or a device (for example, an artificial intelligence electronic device) using an electronic device.

FIG. 1 is a block diagram of an electronic device according to an embodiment of the present disclosure.

Referring to FIG. 1, an electronic device 100 may include a control unit 110, a display unit 120, a memory 130, a sensor unit 140, and a camera 150.

The control unit 110 may control an overall operation of the electronic device 100 and signal flow between constituent elements of the electronic device 100. The control unit 110 may include an application processor (AP) 111. Although not illustrated in the drawing to FIG. 1, the application processor 111 may include a main processor (a central processing unit, CPU) and an image processor (a camera image signal processor, camera ISP).

The display unit 120 may include a panel, a hologram device, or a projector. The display unit 120, particularly, the application processor 111 may display data stored in the memory 130 under the control of the control unit 110. When the display unit 120 is a touchscreen, the display unit 120 may be a touch panel.

The memory 130 may process and store image data received through the camera under the control of the application processor 111. For example, the memory 130 may include a buffer as a temporary data storage, and store the image data in the buffer. The memory 130 may also store a specific image (for example, a user interface) as well as the image data. Furthermore, the memory 130 may store various types of setting information (for example, the brightness of a screen) for setting use environments of the electronic device 100. That is, the control unit 110 may operate the electronic device 100 with reference to the setting information.

The sensor unit 140 may include various sensors in order to detect various events. These events may thus be used to control entry or exit of the electronic device 100 from the various modes of operation, such as the preview mode, the ready mode and the sleep mode.

For example, the sensor unit 140 may include various sensors such as a facial recognition sensor, a pupil recognition sensor, an acceleration sensor, a terrestrial magnetism sensor, a proximity sensor, an infrared sensor, or an illumination sensor. The sensor unit 140 may detect a user's face by using a facial recognition sensor. In the case of detecting a user's face through the sensor unit 140, the control unit 110 may control the electronic device 100 to perform a preset operation. Furthermore, the sensor unit 140 may check the user's pupil by using a pupil recognition sensor. The control unit 110 may also determine the movement of the electronic device 100 by using an acceleration sensor and a terrestrial magnetism sensor. In the case of using a proximity sensor, the control unit 110 may determine whether an object positioned in front of the sensor unit 140 is proximate, and in the case of using an infrared sensor, the control unit 110 may also perform additional determinations by measuring temperature. In the case of using an illumination sensor, the control unit 110 may measure the brightness of a place where the electronic device 100 is positioned. For example, when a user holds the electronic device 100 in a pocket or a bag, the control unit 110 may measure the brightness around the electronic device 100 by using the illumination sensor and perform a preset operation. As described above, any of these events may be utilized to control entry or exit from any mode of the electronic device 100. Different sensors of the sensor unit 140 may be used to control entry or exit from different modes of the electronic device, respectively.

The camera 150 may capture a subject and an image under the control of the control unit 110. The camera 150 may include a lens for collecting light and an image processor for processing the light collected through the lens into an image and storing the processed image in the memory 130. The image processor according to the present disclosure may process raw data, which has been obtained by converting the light collected through the lens into an electrical signal, into an image file, and store the image file in the buffer of the memory 130. The image file may be synthesized with an interface file stored in the memory and may be displayed through the display unit 120 as a preview mode image. The preview mode image is an image displayed on the display unit 120 of the electronic device 100 when the electronic device 100 is in a preview mode, and may be an image obtained by resizing an image size of the raw data such that the raw data fits the size of the display unit 120. For example, the preview mode image may be an image obtained by processing high resolution raw data with low resolution.

An electronic device according to various embodiments of the present disclosure may include a camera; an image processor for processing data received through the camera into a preview image file; a memory; a display unit; a display controller for controlling the display unit; a sensor unit for detecting an event value; and a main processor for checking whether to switch from a preview mode to a ready mode based on the event value received through the sensor unit, deactivating the image processor when switching to the ready mode, and controlling the display controller to display a ready mode image stored in the memory on the display unit.

That is, the electronic device may include a camera, a display unit, a sensor unit configured to detect an external event value, an image processor configured to process data received through the camera into a preview image, and a main processor configured to switch from a preview mode to a ready mode when the external event value is detected by the sensor unit, wherein the preview mode comprises activation of the camera, the image processor to display the preview image on the display unit, and the ready mode comprises deactivation of the camera and the image processor and display of a ready mode image on the display unit.

Figure 2A:
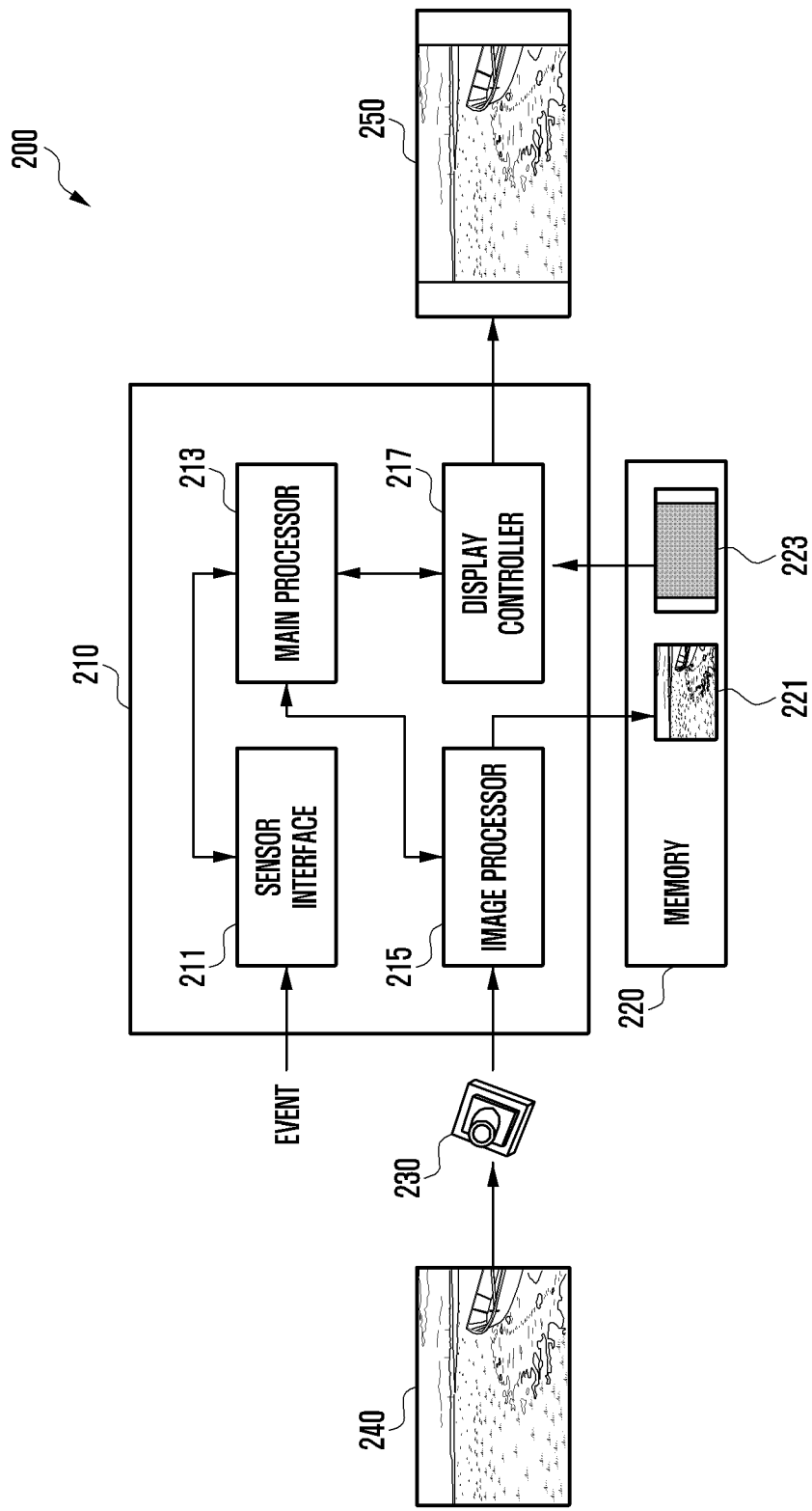
FIG. 2A is a diagram illustrating example operations of a control unit in a preview mode according to an embodiment of the present disclosure.

FIG. 2A is a diagram illustrating example operations of the control unit in the preview mode according to an embodiment of the present disclosure.

Referring to FIG. 2A, a control unit 210 may include a sensor interface 211, a main processor (such as a central processing unit "CPU") 213, an image processor (such as a camera image signal processor, or "camera ISP") 215, and a display controller 217. The control unit 210 may be the control unit 110 of FIG. 1. The main processor 213 may be the application processor 111 of FIG. 1.

Referring to FIG. 2A, an electronic device 200 may receive an image 240 (such as, for example, an image containing a subject and a background) through a camera 230. The electronic device 200 of FIG. 2A may be in a preview mode. In the preview mode, the main processor 213 may transmit the image 240 received through the camera 230 to the image processor 215. The image processor 215 may process the image 240 into image data under the control of the main processor 213. The main processor 213 may store the processed image data in a memory 220. The processed image data may thus be an image file 221 obtained by converting the image 240.

The processed image data may be displayed to a user. For example, the main processor 213 may control the display controller 217 to receive the image file 221 and an interface file 223 stored in the memory 220. The display controller 217 may synthesize the image file 221 with the interface file 223, thereby generating a preview mode image 250. The main processor 213 may control the display controller 217 to display the preview mode image 250 on a display unit 120.

The electronic device 200 may be transitioned between the preview mode and the sleep mode or ready mode. For example, the main processor 213 of the electronic device 200 according to the present disclosure may detect whether an event occurs through a sensor unit, as described above. The sensor unit 140 may be connected to the sensor interface 211 to detect whether an event occurs. The main processor 213 may switch a present mode to another mode when a specific event is detected through the sensor unit 140. That is, the main processor 213 may activate a preview mode, in which the sensor interface 211, the image processor 215, and the display controller 217 are activated, and display the preview mode image 250 in realtime through the display unit 120. In this preview mode, since the electronic device 200 maintains operation of the sensor interface 211, the image processor 215, and the display controller 217 in the preview mode, a large amount of power may be consumed.

TABLE 1

13M Camera FHD@30 fps Preview

| From | To | Data transfer amount | |
| --- | --- | --- | --- |
| Camera | Camera ISP | 4680 Mbps | 13M × 12 bit × 30 fps |
| Camera ISP | Memory (DRAM) | 720 Mbps | 2M × 12 bit × 30 fps |
| Memory (DRAM) | Display Controller | 720 Mbps | 2M × 12 bit × 30 fps |
| | | 6120 Mbps | |

The table above shows data transfer amounts during a preview mode, in which the electronic device 200 receives the image 240 through the camera 230 and displays the preview mode image 250 corresponding to the image 240 through the display unit 120. For example, the electronic device 200 may have a camera with a performance of 13M Camera FHD@30 fps preview therein. The main processor 213 of the electronic device 200 may transmit the image 240 received through the camera 230 to the image processor 215 (such as, for example, the "camera ISP"). At this time, the main processor 213 may transmit the image 240 to the image processor 215 at a speed of 4680 Mbps. The image processor may convert the image 240 into an image file. The main processor 213 may transmit the image file from the image processor 215 to the memory 220. That is, the main processor 213 may transmit the image file from the image processor 215 to the memory 220 at a speed of 720 Mbps. Furthermore, the main processor 213 may transmit the image file from the memory 220 to the display controller 217 at a speed of 720 Mbps. That is, when the electronic device 200 is in the preview mode, data transfer corresponding to 6120 Mb per second may be utilized. Accordingly, in the preview mode, due to the execution of the above-described operations, the control unit 210 of the electronic device 200 may consume a large amount of power in order to process mass data in realtime. Particularly, the electronic device 200 may consume a large amount of power due to a continuous operation of the image processor 215.

FIG. 2B is a diagram illustrating example an operation of the control unit in the ready mode according to an embodiment of the present disclosure.

Referring to FIG. 2B, the control unit 210 of the electronic device 200 may maintain operation of the sensor interface 211, the main processor 213, and the display controller 217 in the ready mode. The ready mode is generated according to the present disclosure and may be a mode in which the camera 230 and the image processor 215 do not consume power. That is, the control unit 210, particularly, the main processor 213 may control the camera 230 and the image processor 215 to be deactivated in the ready mode.

Thus, in the ready mode, the main processor 213 may deactivate the image processor 215 and control the image processor 215 not to receive the image 240 from the camera 230. Then, in the ready mode, the main processor 213 may control the display controller 217 to receive a ready mode image file 225 stored in the memory 220. The ready mode image file 225 may be an image file that is output from the electronic device 200 to the display unit 120 in the ready mode. The main processor 213 may control the display controller 217 to transmit a ready mode image 260 to the display unit 120. The display unit 120 may display the ready mode image 260.

The electronic device 200 may transition to other modes from the ready mode. For example, the main processor 213 according to the present disclosure may activate the sensor interface 211 and detect whether an event occurs through the sensor unit 140 while in the ready mode. When checking for the occurrence of an event through the sensor unit 140, the main processor 213 may switch modes based on the event.

The ready mode may differ from the preview mode in that, since the image processor 215 has been deactivated, the image 240 may not be processed. That is, in the ready mode, power consumption is smaller compared to the power consumption in the preview mode. Furthermore, the display controller 217 may turn off the display unit 120 and report that the current mode is the ready mode by using simple external display (such as, for example, the activation, blinking or flickering of a light emitting diode, or vibration of the electronic device 200). When using the simple external display, the electronic device 200 may consume a smaller amount of power compared to the amount of power when turning on the display unit 120. As described above, the electronic device 200 according to the present disclosure may generate and operate the ready mode between the preview mode and the sleep mode. In the ready mode, the electronic device 200 may consume a smaller amount of power compared to the amount of power in the preview mode.

The control unit 210 of the electronic device 200 according to an embodiment of the present disclosure may activate the sensor interface 211 in the ready mode. That is, the main processor 213 may detect whether an event occurs through the sensor unit 140, and switch from the ready mode to the preview mode when a specific event occurs. For example, when the main processor 213 recognized a user through facial recognition executed through the sensor unit 140, the main processor 213 may switch from the ready mode to the preview mode. That is, the main processor 213 may activate the preview mode and activate the previously deactivated camera 230 and image processor 215. However, if a user's face is not detected through the sensor unit 140, the main processor 213 may switch from the preview mode to the ready mode to conserve power.

FIG. 2C is a diagram illustrating example an operation of the control unit in the sleep mode according to an embodiment of the present disclosure.

Referring to FIG. 2C, the control unit 210 of the electronic device 200 may deactivate the camera 230, the image processor 215, and the display controller 217 in the sleep mode. That is, in the sleep mode, the main processor 213 may activate the sensor interface 211. In the sleep mode, the main processor 213 may deactivate the display controller 217 and the display unit 120.

The electronic device 200 may transition to another mode from sleep mode. For example, the main processor 213 may detect whether an event occurs through the sensor unit 140 in the sleep mode. That is, the main processor 213 may check for the occurrence of an event through the sensor unit 140 in the sleep mode, and switch from the sleep mode to the preview mode. When switching from the sleep mode to the preview mode, the main processor 213 may activate the camera 230, the image processor 215, and the display controller 217.

Figure 3:
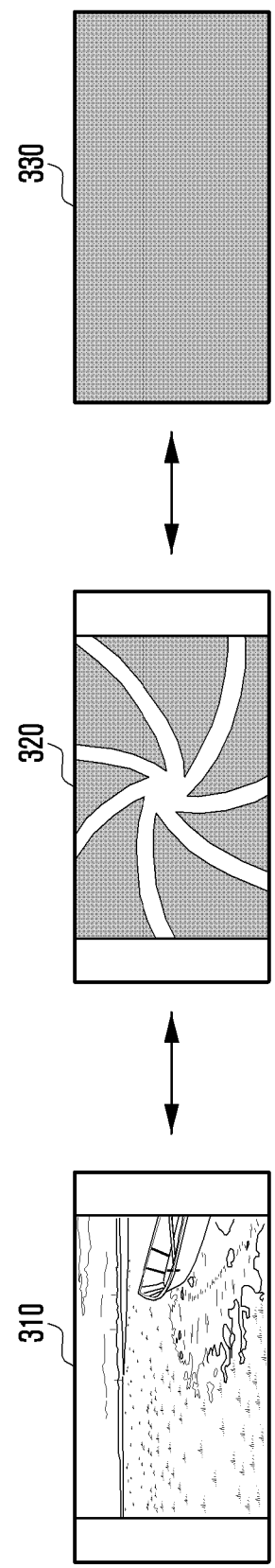
FIG. 3 is a diagram illustrating images displayed on a display unit in each mode according to an embodiment of the present disclosure.

FIG. 3 is a diagram illustrating images displayed on the display unit in each mode according to an embodiment of the present disclosure.

Referring to FIG. 3, the electronic device 100 may display a preview mode image 310 through the display unit 120 in the preview mode. The preview mode image 310 may be an image obtained by synthesizing an image file processed from an image received through the camera 150 with an interface file stored in the memory 130. The electronic device 100 may receive an image through the camera 150 in realtime in the preview mode. That is, the electronic device 100 may display the preview mode image 310, which is an image to be captured, through the display unit 120 in realtime. Then, when the control unit 110 of the electronic device 100 checks the occurrence of an event through the sensor unit 140, the control unit 110 may switch from the preview mode to the ready mode. A ready mode image 320 may be an image that is displayed through the display unit 120 when the electronic device 100 is in the ready mode. The ready mode image 320 may be a specific image file stored in the memory 130.

The electronic device 100 according to various embodiments of the present disclosure may generate the ready mode between the preview mode and the sleep mode, and display the ready mode image 320 through the display unit 120 in the ready mode. In the ready mode, since the electronic device 100 deactivates the image processor, power consumption can be reduced as compared with the preview mode. Furthermore, when the control unit 110 of the electronic device 100 checks the passage of a predetermined time or checks the occurrence of an event through the sensor unit 140, the control unit 110 may switch from the ready mode to the sleep mode.

A sleep mode image 330 may be an image that is displayed through the display unit 120 when the electronic device 100 is in the sleep mode. Since the electronic device 100 according to various embodiments turns off the display unit 120 in the sleep mode, the sleep mode image 330 may be an image in the state in which the display unit 120 is turned off.

Figure 4:
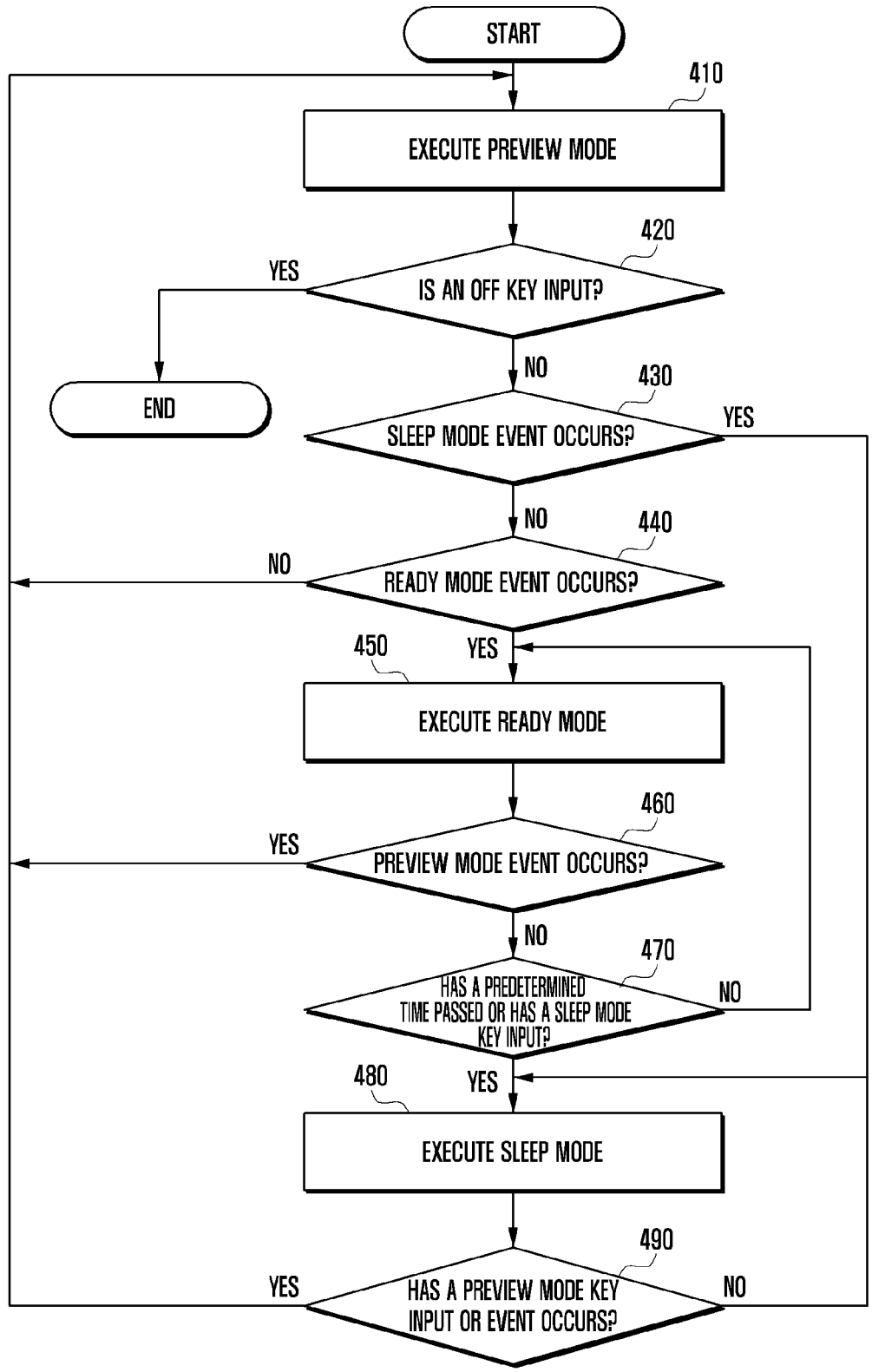
FIG. 4 is a flowchart illustrating an example operation in which an electronic device according to an embodiment of the present disclosure switches modes.

FIG. 4 is a flowchart illustrating example operations in which the electronic device according to an embodiment of the present disclosure switches modes.

Referring to FIG. 4, in step 410, the electronic device 100 may be in the preview mode. In the preview mode, the control unit 110, particularly, the application processor "AP" 111 (such as, for example, the main processor 213 of FIG. 2A) activates the image processor (such as, for example, the image processor 215 of FIG. 2A), receives an image through the camera 150, and displays the image through the display unit 120. That is, the preview mode is a mode in which the electronic device 100 is powered on and can capture an image. In the preview mode, the control unit 110 activates the main processor, the image processor, the sensor interface, and the display controller and processes an image in realtime, and power consumption may be large.

In step 420, the main processor 213 may check an off key input; that is, whether a input has been received from a "power off" key of the electronic device 100. When the main processor 213 does not detect an input from the off key in step 420, the main processor 213 may check whether a event indicating that the sleep mode should be executed occurs in step 430. For example, the main processor 213 may check for the occurrence of the sleep mode event through the sensor unit 140. That is, the main processor 213 may measure an event value of a specific condition through the sensor unit 140, and check whether the sleep mode event occurs based on the event value.

The sleep mode event may be an event for switching to the sleep mode based on an event value measurable through the sensor unit 140. For example, when using an illumination sensor, the main processor 213 measures an illumination value, and may check that the sleep mode event has occurred when the illumination value is equal to or less than a predetermined numeral value. In the case of checking the occurrence of the sleep mode event in step 430, the main processor 213 may switch the preview mode to the sleep mode.

If the sleep mode event did not occur in step 430, then the main processor 213 may determine whether a ready mode event occurs in step 440. The electronic device 100 according to an embodiment of the present disclosure may generate the ready mode between the preview mode and the sleep mode, and switch from the preview mode to the ready mode or switch from the ready mode to the preview mode.

The ready mode event may also be an event for switching to the ready mode based on an event value measurable through the sensor unit 140. When not checking for the occurrence of the ready mode event in step 440, the main processor 213 may stay in the preview mode. When checking for the occurrence of the ready mode event in step 440, the main processor 213 may switch the preview mode to the ready mode.

In step 450, the electronic device 100 may execute the ready mode if the ready mode event is detected. In the ready mode, the control unit 110 may deactivate the image processor and receive no image in realtime. That is, in the ready mode, since an image is not received and processed in realtime, power consumption may be smaller compared to the power consumption in the preview mode. The main processor 213 may display the ready mode image stored in the memory 130 through the display unit 120 in the ready mode. In the ready mode, since the main processor 213 deactivates the image processor, power consumption may be smaller compared to the power consumption in the preview mode. Furthermore, in the ready mode, since the display controller is controlled and the ready mode image is output to the display unit 120, it is possible to more quickly enter the preview mode compared to the sleep mode.

Furthermore, in addition to the operation of displaying the ready mode image on the display unit 120, the main processor 213 may also report that the current mode is the ready mode by using a light emitting diode and the vibration of the electronic device 100. The electronic device 100 according to an embodiment of the present disclosure may provides a method capable of generating the ready mode and reducing power unnecessarily consumed in the preview mode.

Furthermore, the electronic device 100 may enter the preview mode from the ready mode more quickly that it can enter the preview mode from the steed mode. For example, in step 460, the main processor 213 may check whether a preview mode event occurs. If the preview mode event is detected in step 460, the main processor 213 may switch the ready mode to the preview mode.

If the preview mode event is not detected in step 460, the main processor 213 may optionally again check whether a sleep mode event occurs (although this is not illustrated in the drawing). In the case of checking the occurrence of the sleep mode event, the main processor 213 may switch the ready mode to the sleep mode.

The main processor 213 may determine whether a predetermined time passes in which no input is received from a user in step 470. Upon determining that the predetermined time passes in step 470, the main processor 213 may switch from the ready mode to the sleep mode. That is, when the main processor 213 stays in the ready mode for the predetermined time in which no user input is detected, the main processor 213 may switch from the ready mode to the sleep mode in order to reduce power consumption.

Furthermore, the main processor 213 may also check whether input is received via a physical key input of the electronic device 100 configured to activate the sleep mode.

In step 480, the electronic device 100 may execute the sleep mode. In the sleep mode, the display unit 120 is deactivated and power consumption may be reduced as compared to power consumption in the ready mode. However, the time for switching from the sleep mode to the preview mode may be longer than the time for switching from the ready mode to the preview mode. In step 490, the main processor 213 may determine whether the preview mode event occurs.

Furthermore, the main processor 213 may also check for an input received from a physical key input configured to switch to the preview mode. When checking for the occurrence of the preview mode event in step 490, the main processor 213 may switch from the sleep mode to the preview mode. If it is determined that a key input or preview mode event has not occurred in step 490, the main processor 213 may maintain the sleep mode. In the sleep mode, the display unit 120 is turned off. If the electronic device 100 were to reactivate the preview mode from the sleep mode, the main processor 213 would reactivate the image processor and the display unit 120.

A method of operating an electronic device having a camera according to various embodiments of the present disclosure may include: receiving an event value through a sensor unit; checking whether to switch from a preview mode to a ready mode based on the received event value; deactivating an image processor when switching to the ready mode; and controlling a display controller to display a ready mode image stored in a memory on a display unit in the ready mode.

That is, the method may include executing a preview mode wherein the camera and an image processor are active to display a preview image received via the camera on the display, while in the preview mode, detecting an external event value through a sensor unit of the electronic device indicating execution of a ready mode, and executing the ready mode, the ready mode comprising deactivation of the image processor and display of a ready mode image on the display.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory. At least some of the programming modules may be implemented (for example, executed) by, for example, the processor. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Meanwhile, the example embodiments disclosed in the specification and drawings are merely presented to easily describe technical contents of the present disclosure and help the understanding of the present disclosure and are not intended to limit the present disclosure. Therefore, all changes or modifications derived from the technical idea of the present disclosure as well as the embodiments described herein should be interpreted to belong to the present disclosure.

What is claimed is:

1. An electronic device comprising:
a display;
a sensor;
an image processor configured to process camera data received through a camera into an image file; and
a main processor, separate from the image processor, configured to:
execute a preview mode in which the image processor is activated to process the camera data to generate a preview image for display on the display,
determine whether a first preset event is detected through the sensor, and
in response to determining the first preset event is detected, replace execution of the preview mode with execution of a ready mode, the ready mode including deactivating the image processor to terminate power consumption by the image processor, and controlling the display to display a ready mode image retrieved from memory,
wherein the first preset event comprises failure to detect at least one of a face and a pupil.

2. The electronic device of claim 1, wherein, in the ready mode, the main processor is further configured to:
deactivate the display, and
indicate execution of the ready mode by activating a light emitting diode and a motor of the electronic device.

3. The electronic device of claim 1, wherein the main processor is further configured to:

change from the preview mode to a sleep mode deactivating the image processor and the display, when the sensor detects a signal indicating execution of the sleep mode.

4. The electronic device of claim 3, wherein the main processor is further configured to:
change from the sleep mode to the preview mode activating the image processor to display the preview image on the display, when the sensor detects a signal indicating execution of the preview mode.

5. The electronic device of claim 1, wherein the main processor is further configured to:
change from the ready mode to the preview mode reactivating the image processor to display a preview mode image captured by the camera on the display, when the sensor detects a user's face or a user's pupil in the ready mode.

6. The electronic device of claim 1, further comprising a display controller separate from the main processor, wherein the main processor is further configured to:
in response to determining a second preset event is detected by the sensor while the ready mode is executed, terminating execution of the ready mode and executing a sleep mode by maintaining deactivation of the image processor and further deactivating the display controller.

7. The electronic device of claim 6, wherein the main processor is further configured to:
change from the ready mode to the sleep mode when a predetermined time passes in the ready mode.

8. The electronic device of claim 1, wherein the main processor is further configured to execute at least one of the preview mode and the ready mode in response to a key input.

9. A method of operating an electronic device having a camera and an image processor, the method comprising:
executing, by a main processor separate from the image processor, a preview mode in which the image processor is activated to process camera data received through the camera to generate a preview image for display;
determining whether a first preset event is detected through a sensor; and
in response to determining the first preset event is detected through the sensor, replace execution of the preview mode with execution of a ready mode, the ready mode including deactivation of the image processor to terminate power consumption by the image processor, and controlling the display to display a ready mode image retrieved from memory,
wherein the first preset event comprises failure to detect at least one of a face and a pupil.

10. The method of claim 9, wherein the ready mode is an intermediate mode between the preview mode and a sleep mode.

11. The method of claim 9, further comprising:
deactivating the display in the ready mode; and
indicating execution of the ready mode by activating a light emitting diode and a motor of the electronic device.

12. The method of claim 9, further comprising:
changing from the preview mode to a sleep mode deactivating the image processor and the display, when a sensor detects a signal indicating execution of the sleep mode.

13. The method of claim 9, further comprising:
changing from the ready mode to the preview mode reactivating the image processor to display the preview image on the display, when a sensor detects a user's face or a user's pupil in the ready mode.

14. The method of claim 9, further comprising:
changing from the ready mode to a sleep mode deactivating the display, when a sensor detects a signal indicating execution of the sleep mode.

15. The method of claim 14, wherein the changing the ready mode into the sleep mode further comprises:
changing from the ready mode to the sleep mode when a predetermined time passes in the ready mode.

16. The method of claim 14, further comprising:
changing from the sleep mode to the preview mode activating the image processor to display the preview image on the display, when the sensor detects a signal indicating execution of the preview mode.

17. The method of claim 9, further comprising:
executing at least one of the preview mode and the ready mode in response to a key input;
checking a key input according to a user's input; and
controlling to operate a mode corresponding to the checked key input.

18. The method of claim 9, wherein the electronic device is configured to detect the occurrence of the preset event based on at least one of a facial recognition value corresponding to a facial recognition sensor and a pupil recognition value corresponding to a pupil recognition sensor.

19. The method of claim 9, further comprising:
in response to determining a second preset event is detected by the sensor while the ready mode is executed, terminating execution of the ready mode and executing a sleep mode by maintaining deactivation of the image processor and further deactivating a display controller of the electronic device.

* * * * *